GEORGE W. THOMPSON.
Improvement in Plows.
No. 4,925. Reissued May 28, 1872.
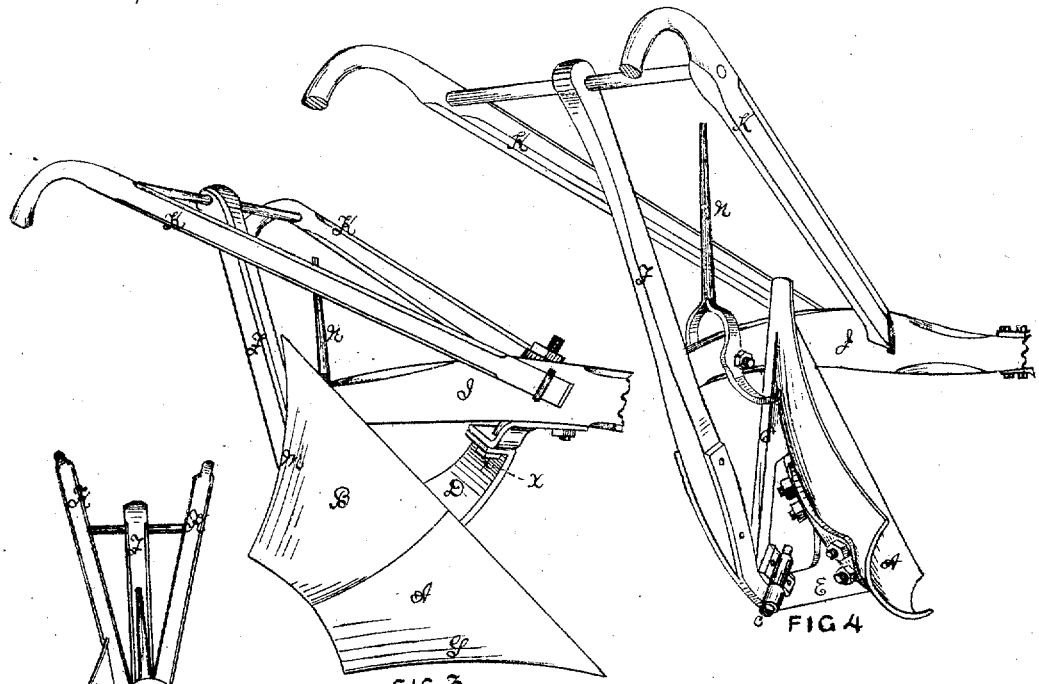
FIG 3.
FIG 4
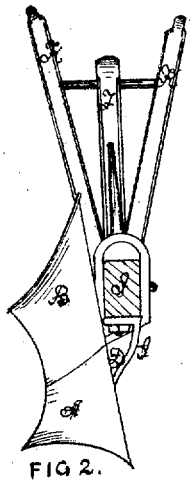
FIG 2.
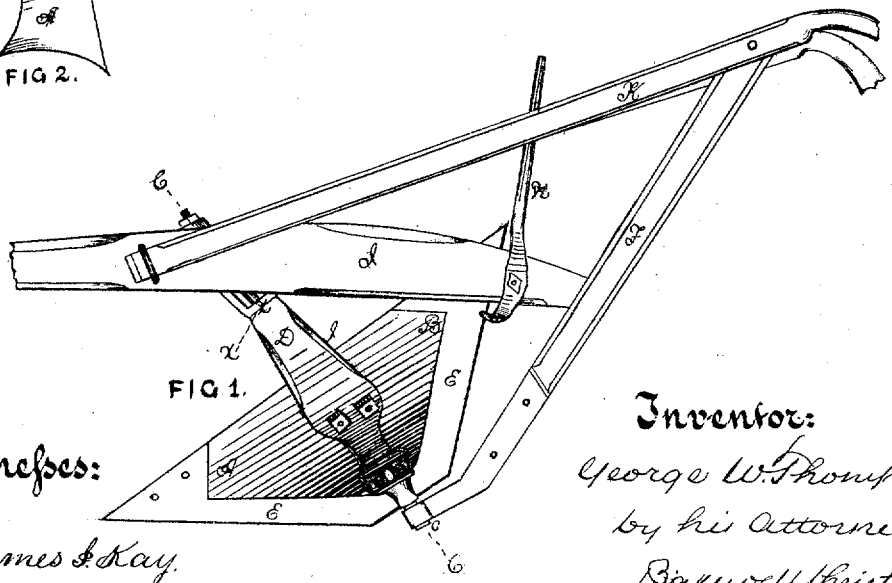
FIG 1.
Witnesses:
James S. Kay.
E. C. Fitler.
Inventor:
George W. Thompson:
by his Attorneys
Baxwell Christy Thurs
AM. PHOTO-LITHOGRAPHIC CO. N.Y. (OSBORNE'S PROCESS.)

UNITED STATES PATENT OFFICE.

GEORGE W. THOMPSON, OF RIPLEY, ASSIGNOR OF TWO-THIRDS INTEREST TO N. HAWK AND J. W. ATWOOD, OF MANCHESTER, OHIO.

IMPROVEMENT IN PLOWS.

Specification forming part of Letters Patent No. 110,692, dated January 3, 1871; reissue No. 4,925, dated May 28, 1872.

SPECIFICATION.

*To all whom it may concern:*

Be it known that I, GEORGE W. THOMPSON, of Ripley, in the county of Brown and State of Ohio, have invented a new and useful Improvement in Reversible Plows; and I do hereby declare the following to be a full, clear, and exact description thereof, reference being had to the accompanying drawing forming part of this description, in which—

Figure 1 is a side view of my plow. Fig. 2 is a front view. Fig. 3 is a perspective view of the opposite side to that shown in Fig. 1. Fig. 4 is a perspective view of the plow seen from the rear end.

In the several figures like letters denote similar parts of my plow.

My improved reversible hill-side plow consists, principally, of a double mold-board—one a right-hand and the other a left-hand plow—placed end to end, and thus firmly attached to a revolving standard which is placed at or about an angle of forty-five degrees to the horizon, and pivoted to the beam, so that by turning the plowshare nearly half round it is reversed, and thus forms either a right or left hand plow, at pleasure.

The upper and lower portion of the reversible part of the plow is in two pieces, the upper part being shaped exactly like the lower part, excepting that one is right-hand and the other left-hand, and when in use the lower half A serves as the cutter or share and the upper half B as the mold-board; but when reversed the parts are simply transposed, B being then the lower part and serving as the share or cutter, and A becoming the upper part and serving as the mold-board. This is effected by making the line of the axis of revolution to bisect the angle formed by the horizontal and vertical lines of the edges of the double mold-board, as seen in Fig. 1.

To enable others skilled in the art to construct and use my improvement, I will proceed to describe it more particularly.

The beam J and handle K K are of any desired construction. Instead of having a vertical or nearly vertical standard, as is usual, rigidly attached at its upper end to the beam, the standard D is inclined at an angle of about forty-five degrees to the horizon, the angle being such that the axis of the standard (being the line *c* in Fig. 1) bisects the angle formed by the prolongation of the lower line of the lower mold-board A and the corresponding edge of the upper mold-board B. The standard D is pivoted at *x*, Fig. 1, to the beam J, so as to turn readily when free to do so, and it extends down in rear of the double mold-board, being of such shape as to conform to that of the rear face of the double mold-board which is attached to it. The standard above the double mold-board is bent, as at I, instead of extending up in a direct line to the beam, for the purpose of allowing more space for the passage of straw, weeds, &c., and thus prevent clogging. The two parts A B of the mold-board are exactly alike in shape, excepting that one is made as for a right-hand plow and the other as for a left-hand plow, and may be of any desired pattern or style, excepting that the rear edge opposite to the point is a right line, so that the two mold-boards may fit together on the standard at the line C C. They may be made of cast-iron, steel, or wrought-iron, as may be desired; but one great advantage of my improvement is that the mold-board and all the metallic parts of the plow may readily be made of wrought-iron or steel, the mold-board being bent to the required curvature by means of a drop-press or other suitable bending apparatus. The mold-boards are attached to the revolving standard by rivets or bolts along the line C C. E represents the land-sides of the two mold-boards, which serve as braces to support them, and to which they are riveted or welded at or near the forward ends of their lower edges G and M, respectively. The brace E may be made in one or two pieces, as may be preferred. A post, F, connecting the beam and the cross-piece between the plow-handles, extends downward to a point in the line of, but below, the axis of the revolving standard; and a pin, *c*, in the axial line C, enters an eye or loop in the brace or land-side E at the lowest point of contact of the two mold-boards A and B. This pin *c* forms the lower journal, on which the reversible part of the plow is pivoted. A hand-lever, N, is pivoted to the rear end of the beam of the plow, near the handles, so as to be within easy reach of the plowman, the lower part of this lever being forked and curved, as seen in Figs. 1, 2, and 4, so as to engage the brace or land-side E and hold the mold-board firmly in place on whichever side of the beam it may happen to be.

The plow being constructed as described, whenever it is desired to reverse it the handle of the lever N is pressed forward so as to disengage the reversible part of the plow, when a side motion of the handles of the plow will cause the double mold-board, with its standard, to make a half-revolution, or nearly so, on the pivots *x* and pin *c*, bringing the upper mold-board B with its edge M next to the ground, and the lower mold-board A with its edge G vertical, or nearly so, thus making what was a right-hand plow a left-hand one, or vice versa.

This construction of plow has several striking advantages over the ordinary styles of reversible hill-side plows heretofore in use, among which may be mentioned that the two similarly-shaped (one right-hand and the other left-hand) shares, forming one mold-board, makes the plow substantially a double one, so that it will wear nearly twice as long as an ordinary reversible-plow; also, the locking device employed gives great facility for shifting the plow at the end of a furrow without the necessity of stopping the team.

Having thus described my improvement in reversible-plows, what I claim as my invention, and desire to secure by Letters Patent, is—

1. The double-mold-board, composed substantially of right and left hand plowshares, united to an inclined revolving standard, D, as and for the purposes set forth.

2. The combination of inclined standard D, plowshares A B fastened thereto, and brace E, substantially as set forth.

3. In combination with the mold-board and beam of a reversible-plow, the standard D, bent, as at I, toward the land-side and from the colter, to prevent clogging, substantially as described.

In witness whereof I, the said GEORGE W. THOMPSON, have hereunto set my hand.

GEO. W. THOMPSON.

Witnesses:
JOHN M. CAGEN,
HOLLIS DONNING.